US010316457B2

(12) United States Patent
Singley

(10) Patent No.: US 10,316,457 B2
(45) Date of Patent: Jun. 11, 2019

(54) FLOOD PREVENTION DEVICE

(71) Applicant: Brent Richard Singley, Inkom, ID (US)

(72) Inventor: Brent Richard Singley, Inkom, ID (US)

(*) Notice: Subject to any disclaimer, the term of this patent is extended or adjusted under 35 U.S.C. 154(b) by 343 days.

(21) Appl. No.: 15/123,478

(22) PCT Filed: Mar. 3, 2015

(86) PCT No.: PCT/US2015/018478
§ 371 (c)(1),
(2) Date: Sep. 2, 2016

(87) PCT Pub. No.: WO2015/134491
PCT Pub. Date: Sep. 11, 2015

(65) Prior Publication Data
US 2017/0073876 A1    Mar. 16, 2017

Related U.S. Application Data

(60) Provisional application No. 62/054,953, filed on Sep. 24, 2014, provisional application No. 61/947,040, filed on Mar. 3, 2014.

(51) Int. Cl.
E03B 7/07     (2006.01)
G05D 7/06    (2006.01)
D06F 39/08   (2006.01)
F16K 31/06   (2006.01)

(52) U.S. Cl.
CPC .......... D06F 39/081 (2013.01); E03B 7/071 (2013.01); F16K 31/06 (2013.01); G05D 7/0635 (2013.01); Y10T 137/1842 (2015.04)

(58) Field of Classification Search
CPC ........ D06F 39/081; E03B 7/071; F16K 31/06; G05D 7/0635; Y10T 137/1842
See application file for complete search history.

(56) References Cited

U.S. PATENT DOCUMENTS

| | | |
|---|---|---|
| 3,034,085 A | 5/1962 | Pauler et al. |
| 3,466,006 A | 9/1969 | Livingston |
| 3,471,782 A | 10/1969 | Matsumoto |
| 3,788,347 A | 1/1974 | Guth |
| 3,868,968 A | 3/1975 | Fuhrmann |
| 4,805,662 A | 2/1989 | Moody |
| 5,069,631 A | 12/1991 | Bauer et al. |
| 5,313,981 A | 5/1994 | Gonzalez |

(Continued)

FOREIGN PATENT DOCUMENTS

| | | |
|---|---|---|
| EP | 1 724 401 A2 | 11/2006 |
| EP | 2 458 064 A3 | 5/2013 |
| EP | 2 634 305 A1 | 9/2013 |

Primary Examiner — Marina A Tiet Jen
Assistant Examiner — Frederick D Soski
(74) Attorney, Agent, or Firm — Davis & Bujold, P.L.L.C.; Charles Holoubek

(57) ABSTRACT

A flood prevention device comprising a first solenoid valve, an input on the first solenoid valve designed to attach to and receive fluid flow from a mainline water or gas source; a wiring harness to electrically connect the first solenoid valve to an appliance control unit, and a first supply hose, with a first end attached to an output of the first solenoid valve and a second end designed to attach to and deliver fluid to an appliance.

18 Claims, 8 Drawing Sheets

(56) References Cited

U.S. PATENT DOCUMENTS

| | | |
|---|---|---|
| 5,315,291 A | 5/1994 | Furr |
| 5,934,302 A | 8/1999 | Nemelka |
| 5,941,502 A | 8/1999 | Cooper |
| 6,003,536 A | 12/1999 | Polverari et al. |
| 6,057,770 A | 5/2000 | Justesen |
| 6,427,276 B1 | 8/2002 | Comer |
| 6,461,192 B1 | 10/2002 | Kwoka |
| 6,543,480 B1 | 4/2003 | Mazzei et al. |
| 6,612,323 B1 | 9/2003 | Horne |
| 6,895,788 B2 | 5/2005 | Montgomery |
| 7,082,959 B1 | 8/2006 | Franklin |
| 7,574,878 B2 | 8/2009 | Schroeder |
| 8,266,930 B2 * | 9/2012 | Jeong ............... D06F 29/00 68/13 R |
| 2003/0005731 A1 | 1/2003 | Montgomery |
| 2005/0127194 A1 | 6/2005 | Lahrmann et al. |
| 2006/0048550 A1 | 3/2006 | Slutsky |
| 2008/0169034 A1 | 7/2008 | Schroeder |
| 2011/0056723 A1 * | 3/2011 | Slippy ............... H01R 13/5808 174/73.1 |
| 2011/0059642 A1 * | 3/2011 | Slippy ............... H01R 13/5808 439/353 |
| 2012/0028508 A1 * | 2/2012 | Johnston ............ A61H 33/6063 439/668 |
| 2012/0256110 A1 | 10/2012 | Legaspi et al. |
| 2013/0241727 A1 | 9/2013 | Coulombe |
| 2014/0318650 A1 | 10/2014 | Wolff et al. |

* cited by examiner

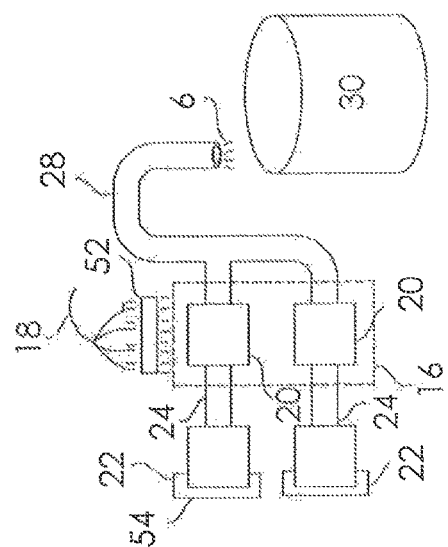
FIG.2
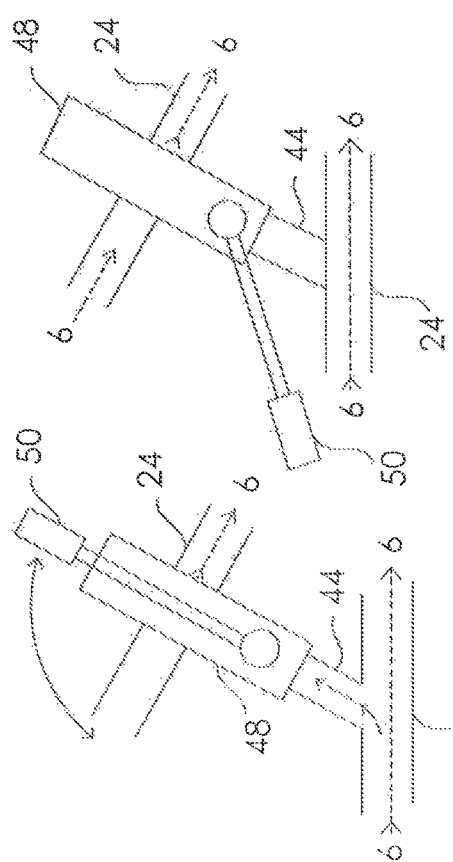
FIG.3
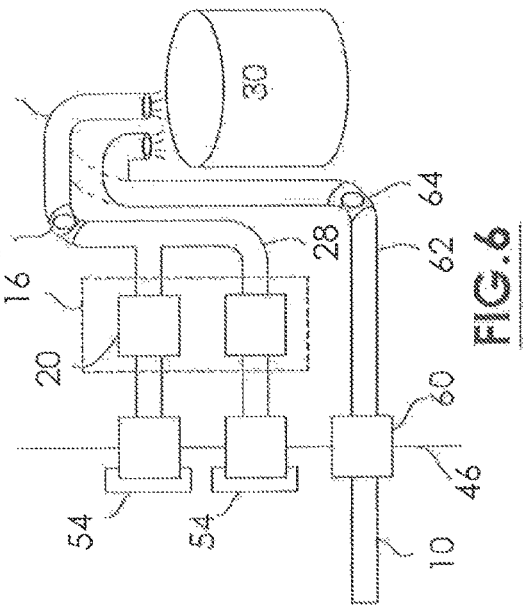
FIG.4
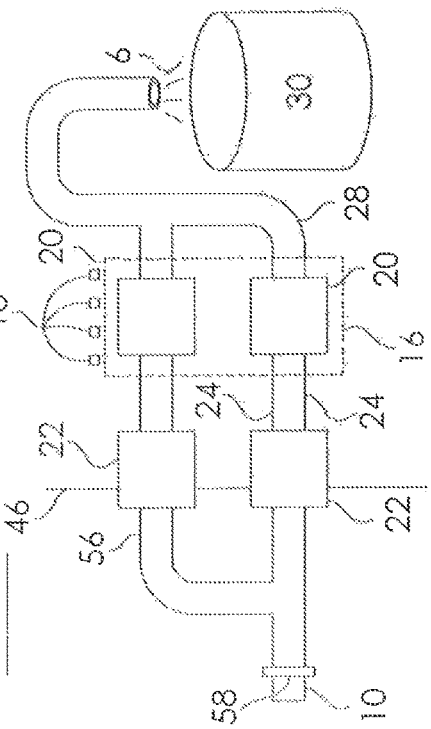
FIG.5
FIG.6

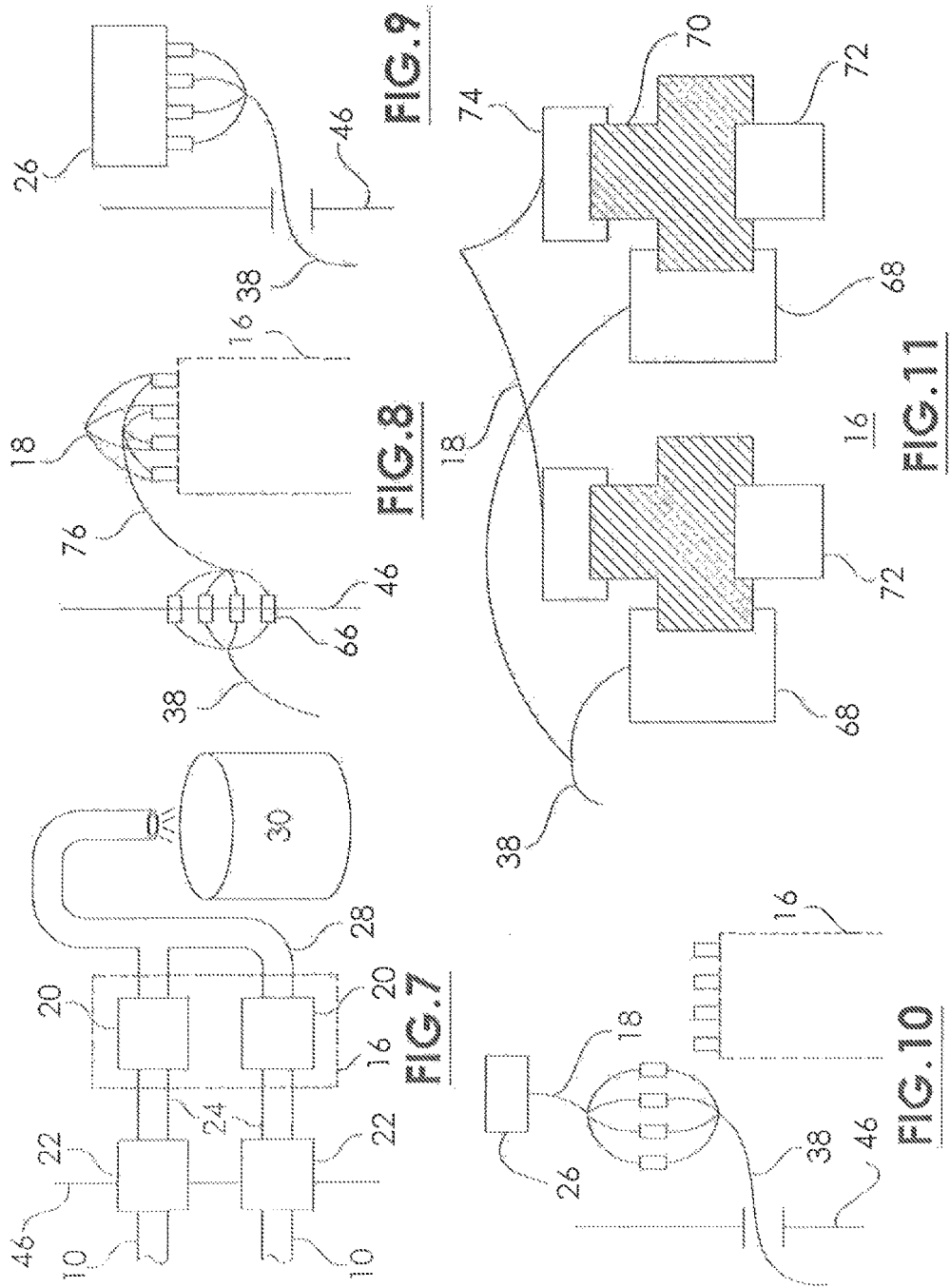

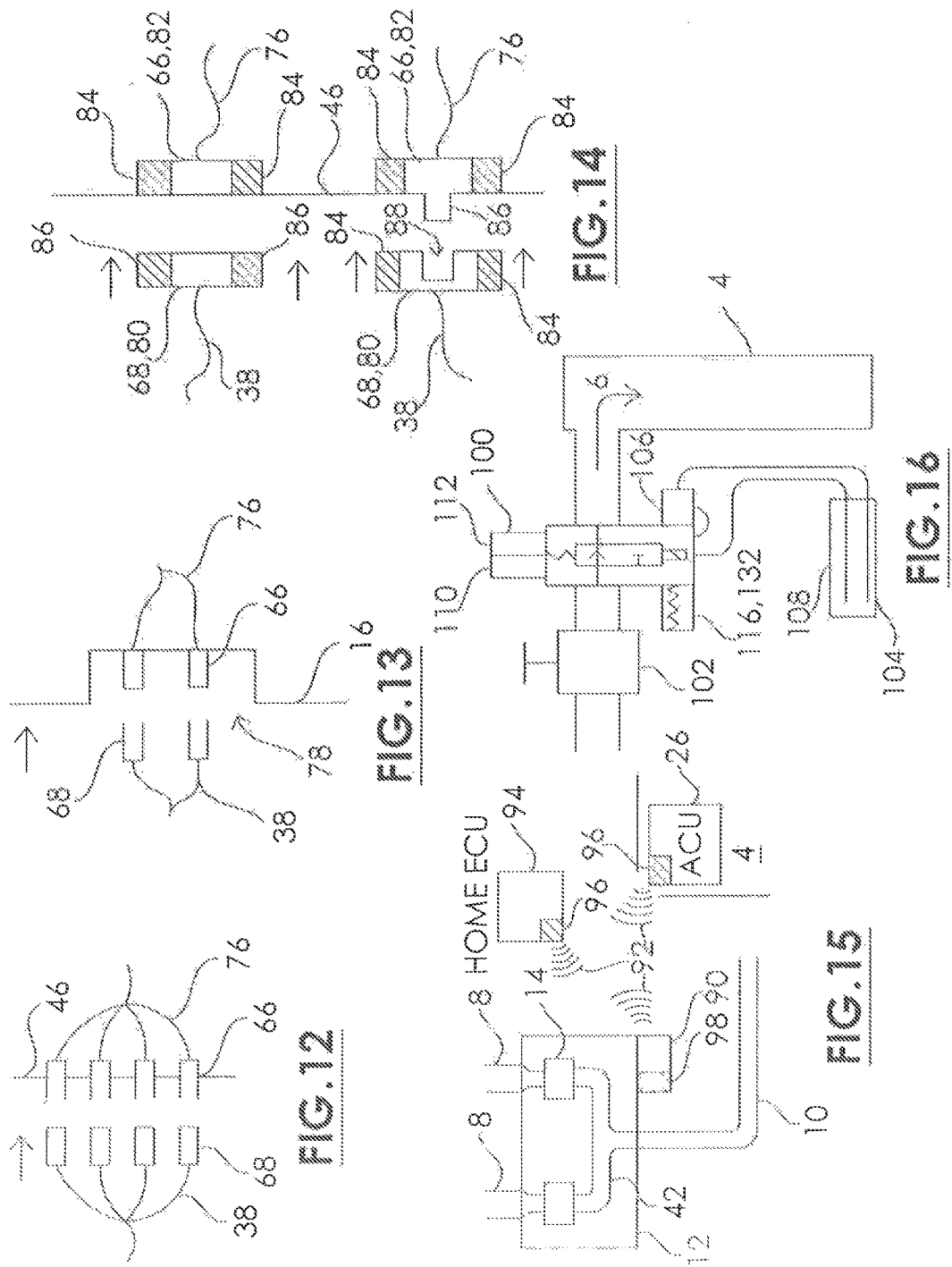

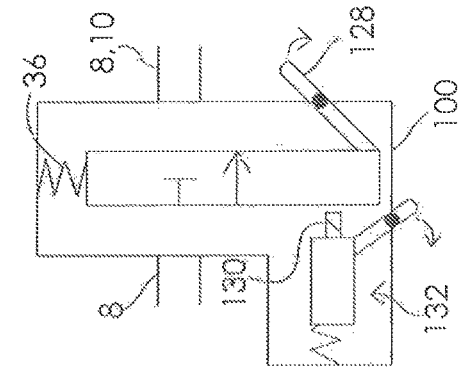
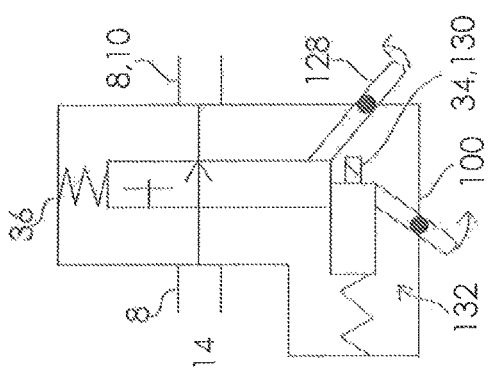
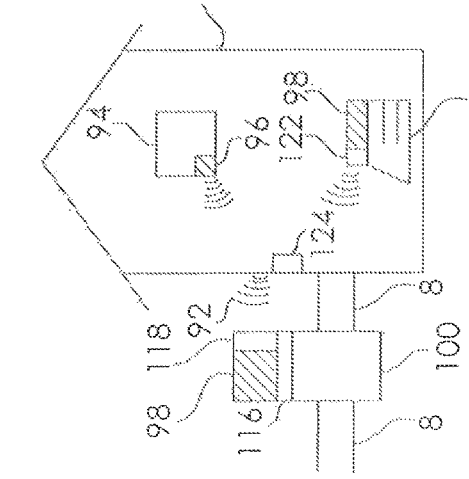
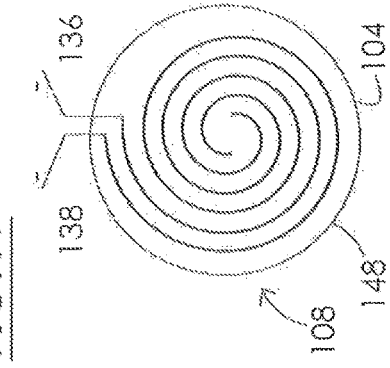
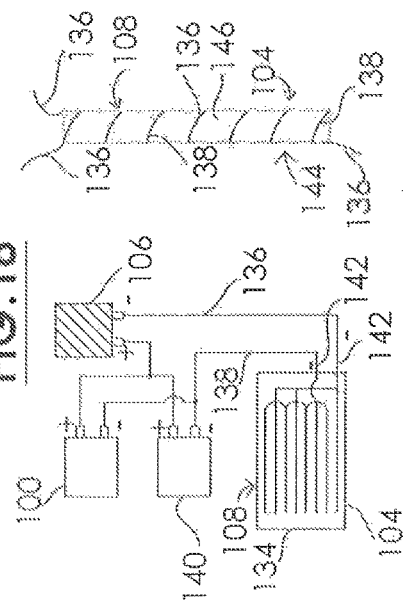
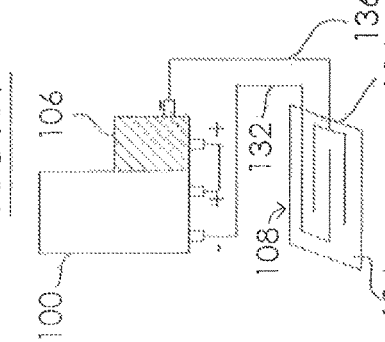

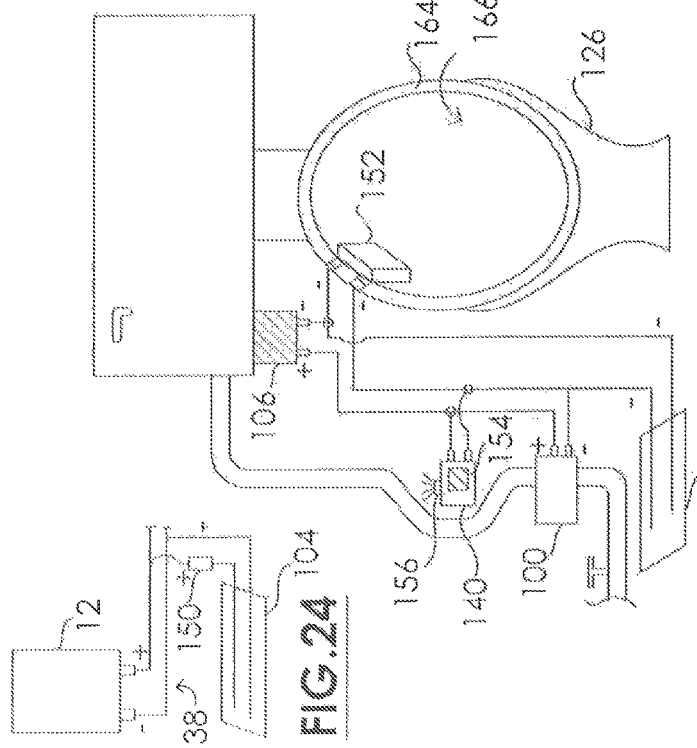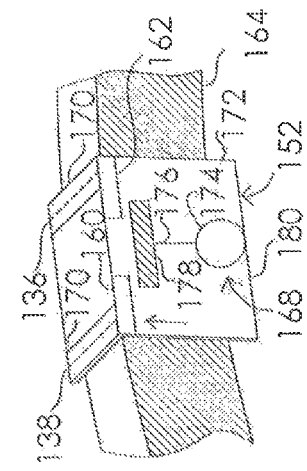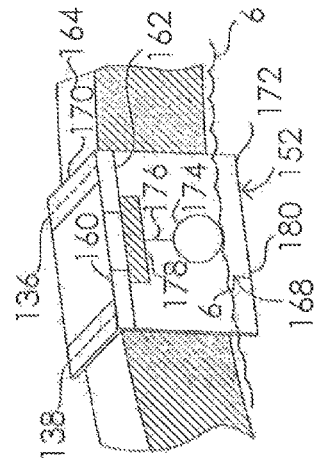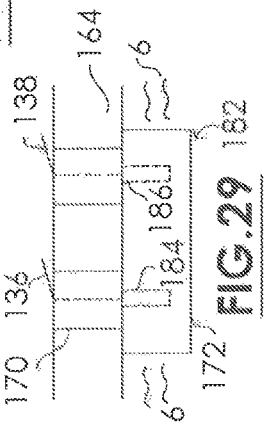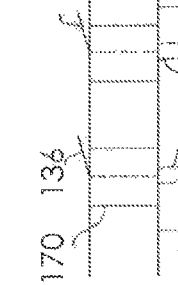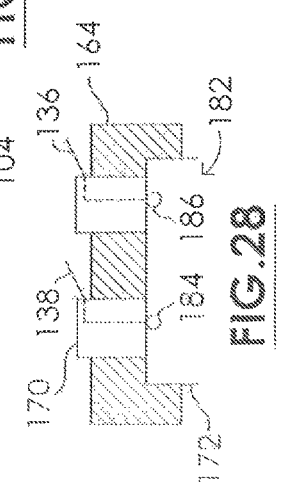

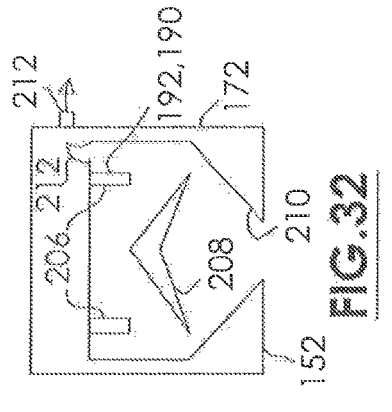
FIG. 32
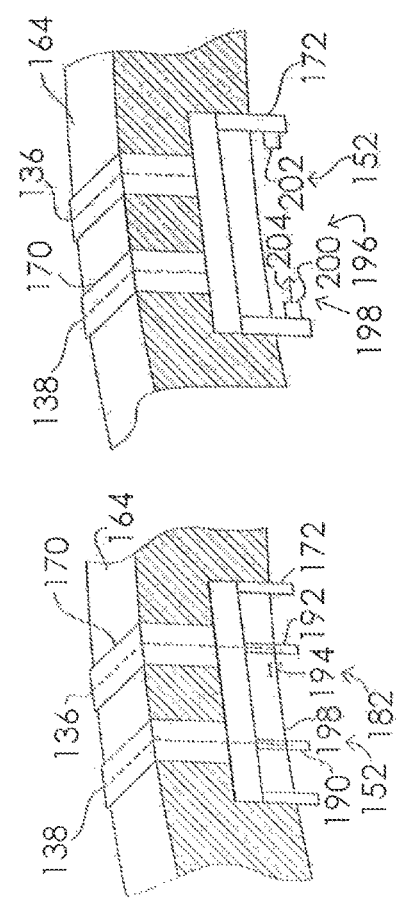
FIG. 30
FIG. 31
FIG. 33
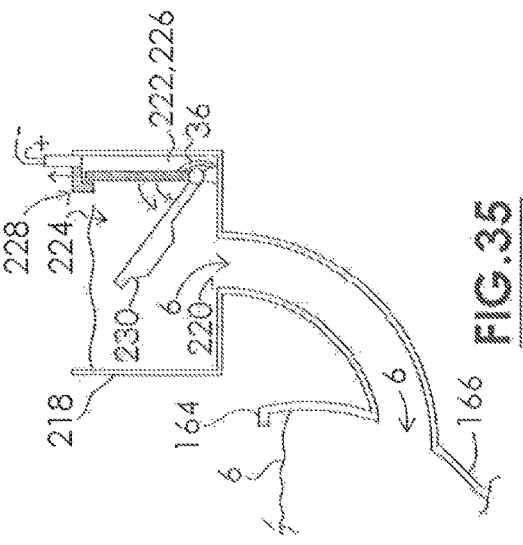
FIG. 35
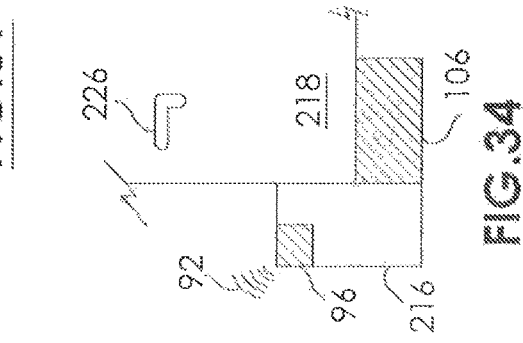
FIG. 34

FLOOD PREVENTION DEVICE

This application is a National Stage completion of PCT/US2015/018478 filed Mar. 3, 2015, which claims priority from U.S. provisional application Ser. Nos. 62/054,953 and 61/947,040 filed Sep. 24, 2014 and Mar. 3, 2014 respectively.

FIELD OF THE INVENTION

The invention relates to flood prevention systems in general and specifically to devices which prevent flooding from household appliances.

BACKGROUND OF THE INVENTION

In current practice in the art, household appliances are provided water or gas from mainline pressurized sources via flexible supply hoses. The flexible supply hoses connect the water or gas from the mainline to the appliance solenoid valve(s). These valves are uniformly located inside the appliance. The flexible supply hoses are under constant high-pressure until the appliance control unit initiates a signaled demand. When the appliance demands flow, the internal solenoid valve opens and pressure drops in the flexible supply hoses as fluid flows through. When the demand for flow stops, the appliance internal solenoid valve (ISV) closes, and the pressure in the flexible supply hoses surges. This surge is combined with hot water exposure for a hot water flexible supply hose. Pressure changes and hose movement expose the hoses, valve(s), connections and multiple fittings to an increased probability of leaking and catastrophic failure, as evidence by a long history of insurance claim statistics.

Further, high-pressure flexible lines are substandard to mainline compliant plumbing and are a weak link in household plumbing. Yet, maintenance of this piece of household plumbing that is very susceptible of failure is typically provided by a nonprofessional, such as a homeowner. Failures occur because of constant high-pressure, high heat, improper movement by the homeowner, freezing, age of hoses, stripped threads, improper maintenance, and mainline pressure surges. Extensive flood damages have occurred because of the current antiquated method and system.

SUMMARY OF THE INVENTION

Wherefore, it is an object of the present invention to overcome the above mentioned shortcomings and drawbacks associated with the prior art.

Another object of the present invention is to provide fluid to appliances via low pressure supply hoses.

A further object of the present invention is to locate a normally closed solenoid control valve exterior to the appliance, directly on a mainline compliant piping or faucet;

Yet another object of the present invention is to provide an electrical supply from the appliance to the solenoid control valve that is shorter than the supply hose, to automatically unplug the solenoid control valve from its electrical source and close the valve before the supply hose is pulled taught or potentially ruptures;

A still further object of the present invention is to provide a water detector circuit electrically or wirelessly connected to the solenoid control valve, where the detector circuit that detects potential uncontrolled water situations and causes the solenoid control valve to close upon such detection;

The present invention also relates to a flood prevention device comprising a first solenoid valve, an input on the first solenoid valve designed to attach to and receive fluid flow from a mainline water or gas source, a wiring harness to electrically connect the first solenoid valve to an appliance control unit, a first supply hose, with a first end attached to an output of the first solenoid valve and a second end designed to attach to and deliver fluid to an appliance.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which:

FIG. 2 is a diagrammatic representation of an "H" bridge connector connecting two inlet hoses, with the selector valve open to the bridge connector;

FIG. 3 is a diagrammatic representation of the "H" bridge connector in FIG. 2 with the selector valve closed to the bridge connector;

FIG. 4 is a diagrammatic representation of a wiring adaptor between the dual solenoid interior supply valve and the internal control wires;

FIG. 5 is a diagrammatic representation of an exterior "Y" adaptor attaching a single supply hose to both back wall supply ports;

FIG. 6 is a diagrammatic representation of a single supply hose routed through a third exclusive back wall supply port and into an exclusive output hose or, in dashed lines, a routing to a shared output hose with the dual internal solenoid valve;

FIG. 7 is a diagrammatic representation of the flood prevention device utilizing dual supply hoses;

FIG. 8 is a diagrammatic representation of a plug-in electrical connection on the exterior of the appliance between the wiring harness and the internal electric control wiring via a jump connection;

FIG. 9 is a diagrammatic representation of a direct connection between the wiring harness and the appliance control unit;

FIG. 10 is a diagrammatic representation of a direct connection between the wiring harness and the internal electric control wiring FIG. 11 is a diagrammatic representation of the wiring harness, the internal electric control wiring and the internal solenoid valve electrical contacts via a plug-on connection;

FIG. 12 is a diagrammatic representation of the plug-in electrical connection of FIG. 8 with the wiring harness electrical contacts unplugged;

FIG. 13 is a diagrammatic representation of a variation of the plug-in electrical connection of FIG. 8 with the wiring harness having a socket contact that engages a plug protruding from a recessed portion of the appliance surface:

FIG. 14 is a diagrammatic representation of magnetic engagement variation of the plug-in electrical connection of FIG. 8;

FIG. 15 is a diagrammatic representation of a remote control embodiment of the flood prevention device;

FIG. 16 is a diagrammatic representation of a leak detection and prevention embodiment of the flood prevention device, with a spring biased open valve that can be releasably latched closed;

FIG. 17 is a diagrammatic representation of a variation of the embodiment of FIG. 16 with wireless capability and the valve mounted on the main fluid input line of the building;

FIG. 18 is a diagrammatic representation of a variation of the valve in FIG. 16, where the valve is spring biased closed, but releasably latched open and shown in its releasably latched open state;

FIG. 19 is a diagrammatic representation of the valve of FIG. 18 shown in its unlatched, spring biased closed state;

FIG. 20 is a diagrammatic representation of a fluid sensor and grounding circuit for the leak detection and prevention embodiment of flood prevention device;

FIG. 21 is a diagrammatic representation of a length and width adjustable fluid sensor variation of the fluid sensor of FIG. 20;

FIG. 22 is a diagrammatic representation of a rope like variation of the fluid sensor of FIG. 20;

FIG. 23 is a diagrammatic representation of spiral variation of the fluid sensor of FIG. 20

FIG. 24 is a diagrammatic representation of a water sensing and circuit opening variation of the flood prevention device of FIG. 1;

FIG. 25 is a diagrammatic representation of a front, partially elevated view of a toilet optimized embodiment of the flood prevention device;

FIG. 26 is a diagrammatic representation of a front view of float actuated version of the overflow detector of FIG. 25 in a non-imminent overflow state;

FIG. 27 is a diagrammatic representation of the float actuated overflow detector of FIG. 26 in an imminent overflow state;

FIG. 28 is a diagrammatic representation of a front view of a first version of a stationary overflow detector;

FIG. 29 is a is a diagrammatic representation of a top view of the stationary overflow detector of FIG. 28;

FIG. 30 is a diagrammatic representation of a front view of a second version of a stationary overflow detector;

FIG. 31 is a diagrammatic representation of a light sensing overflow detector;

FIG. 32 is a diagrammatic representation of a front sectional view of the stationary overflow detector of FIG. 30 with a partially open bottom and one variation of shielding;

FIG. 33 is a diagrammatic representation of a side sectional view of the stationary overflow detector of FIG. 30 with a partially open back and another variation of shielding;

FIG. 34 is a diagrammatic representation of the a wireless enabled toilet control unit;

FIG. 35 is a diagrammatic representation of a first variation of a forced closed flush valve passage actuator in a latched open state;

DETAILED DESCRIPTION OF THE INVENTION

The present invention will be understood by reference to the following detailed description, which should be read in conjunction with the appended drawings. It is to be appreciated that the following detailed description of various embodiments is by way of example only and is not meant to limit, in any way, the scope of the present invention.

Figure 1:
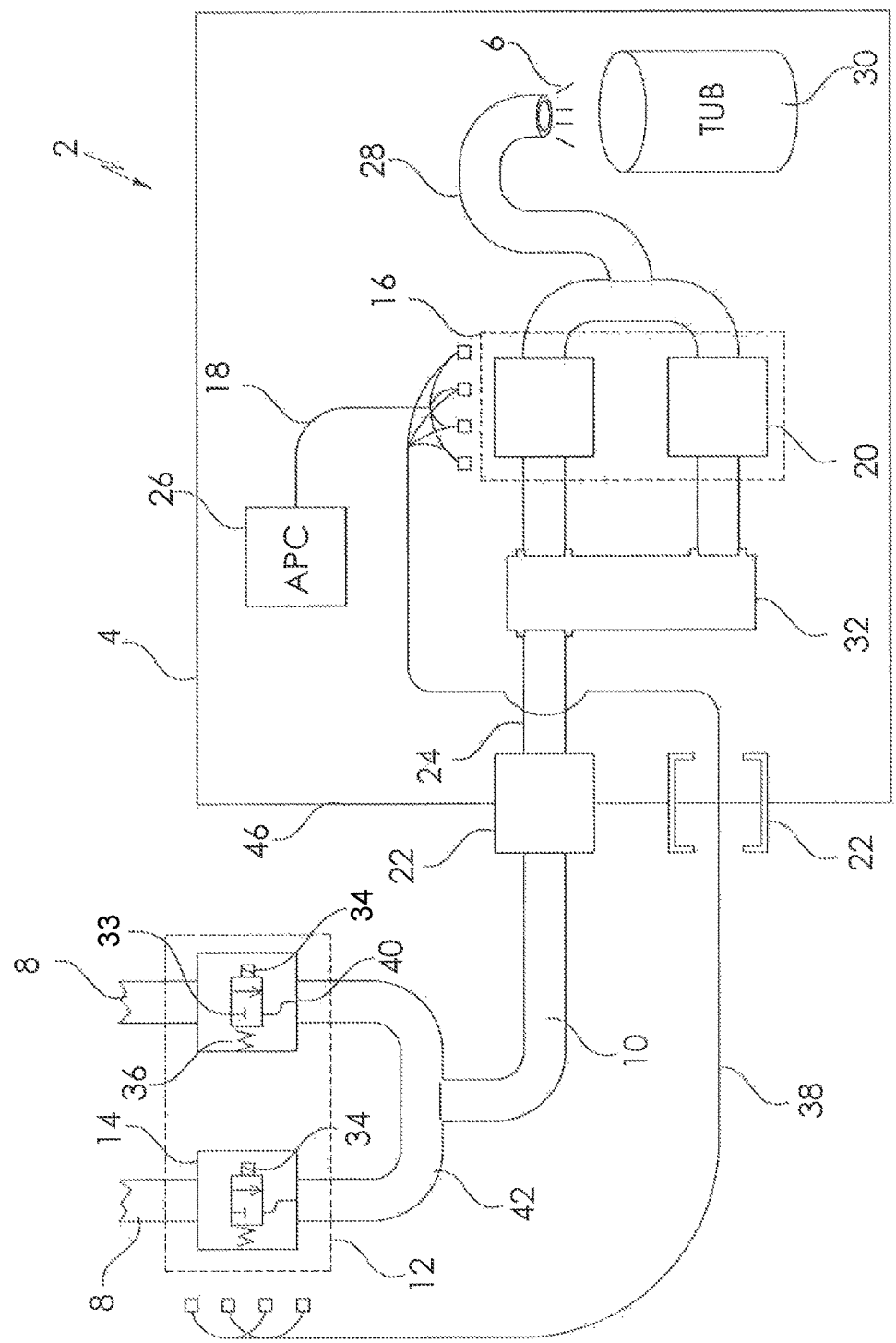
FIG. 1 is a diagrammatic representation of a first embodiment of the flood prevention device.
Figure 37:
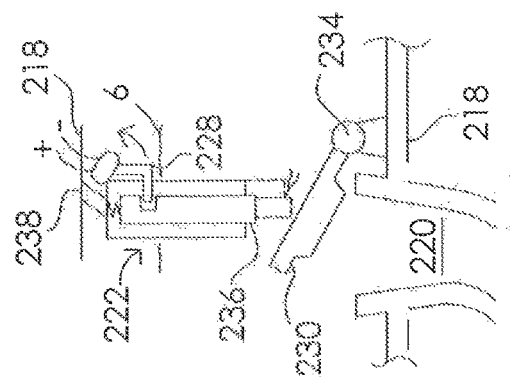
FIG. 37 is a diagrammatic representation of a third variation of a forced closed flush valve passage actuator in a latched recessed state.
Figure 36:
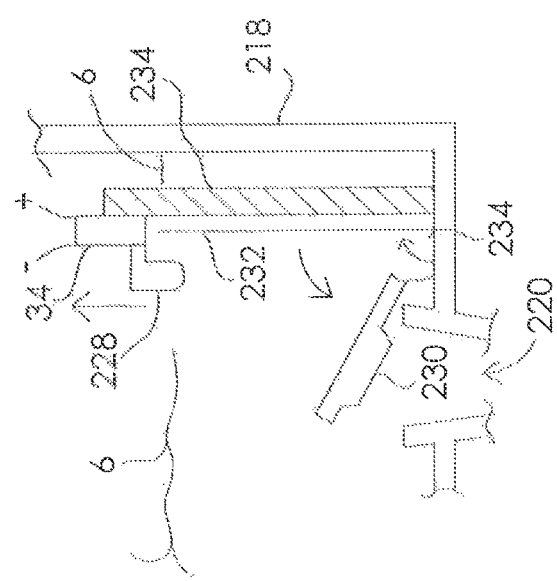
FIG. 36 is a diagrammatic representation of a second variation of a forced closed flush valve passage actuator in a latched open state.

Turning now to FIG. 1, a brief description concerning the various components of the present invention will now be briefly discussed. As can be seen in this embodiment of the flood prevention device 2, a washing machine 4 or other fluid 6 supplied appliance 4 is fluidly connected to the mainline plumbing 8 via a low pressure supply hose 10 and an exterior solenoid valve, also called an on demand fluid flow valve (ODFFV) 12, which is a dual solenoid valve with separate hot and cold valves 14, where the fluid 6 is hot water or cold water. Such fluid 6 supplied appliances 4 will normally have a dual solenoid interior supply valve (ISV) 16 controlled by a set of internal electric control wiring 18 signal wires for each separate hot or cold valve 20 of the ISV 16. In some later embodiments, especially with other appliances 4, the ODFFV and/or the ISV may have just a single solenoid valve 14, 20.

The appliance 4 shown normally has a two back wall supply ports 22 for receiving hot and cold water 6, respectively, from high pressure supply hoses-such hoses not necessary in the disclosed invention. The water 6 is then routed from the back wall supply ports 22 through hot and cold inlet hoses 24 to the respective hot and cold ISV 16. The hot and cold valves 14 of the ISV 16 are opened, closed, and otherwise controlled by an Appliance Control Unit (ACU) 26 or timer. Water 6 flows from the ISV 16 through an output hose 28 to the tub 30 of the washing machine 4, where the water 6 is used to clean clothes.

In the embodiment shown, only a single back wall supply port 22 is required or utilized for fluid delivery. The water 6 is then routed from the single back wall port 22 to a Y hose adaptor 32 and then to both hot and cold water valves 14 of the ISV 16. The ISV 16 are normally spring biased off solenoid vales that open when energized by current supply by the ACU 26, through the internal electric control wires 18, and that automatically close when the current from the ACU 26 stops. It is noted that in other embodiments of the flood prevention device 2 the ISV 16 is not present.

When water leaves the ISV 16, the output from both the hot and the cold valves 20 of the ISV 16 is normally combined, and this combined water 6 is directed to a single output hose 28, which then directs the combined water into the tub 30 of the washing machine.

The ACU 26 or timer controls when and how much current is delivered to each valve 20 of the ISV. An internal control wiring 18 connects the ACU 26 or timer to the ISV 16 to energize or open the respective valve 20. Current is delivered to the hot water valve 20 of the ISV 16 via the internal control wiring 18 when hot water 6 is demanded by the ACU 26, energizing the hot water solenoid and opening the hot water valve 20 to allow hot water 6 to flow in from the hot water supply hose 24. When cold water 6 is demanded by ACU 26 a similar sequence is followed with the cold water valve 20 of the ISV 16. When warm water 6 is demanded, the ACU 26 delivers current to both the hot water and the cold water valves 20 of the ISV 16. Warm water 6 is understood as being a temperature between an exclusively cold water 6 delivery and an exclusively hot water 6 delivery. The warm water 6 mixture can be an even mix of hot water 6 and cold water 6, or an uneven mix. If a higher temperature warm water 6 is demanded, then the ACU 26 will energize and open the hot water valve 20 of the ISV 16 more or longer than it 26 opens the cold water valve 20 of the ISV 16, letting more hot water 6 through than cold water 6 through. When colder warm water 6 is desired, the ACU 20 follows a similar sequence but with the hot and cold water valves 20 of the ISV 16 reversed.

In the embodiment shown, external solenoid on demand fluid flow valves 12 are located at the mainline water source 8, likely screwed into a faucet (not shown) that is in fluid connection with the mainline water source 8. The ODFFV 12 has inlet ports 33 for hot and cold water 6 respectively. The ODFFV 12 typically run on 110/120 volts and are typically powered and controlled by the ACU 26 from the inside of the appliance 4. The ODFFV 12 is a pair of spring 36 biased closed valves 14, which preferably open against the spring 36 bias via a respective pair of solenoids 34 when energized/actuated open. When the power is removed, the spring 36 pushes the valves 14 closed automatically. The ODFFV 12 is connected directly to the high pressure mainline water source 8. Such connection maintains high-pressure at the valves 14, and prevents the low pressure supply hose 10 from being exposed to constant high pressure fluid 8, especially for an extended time, as is the current practice in the art.

An external wiring harness 38 connects the ODFFV 12 with the ACU 26, directly or indirectly, to provide power to control and actuate the ODFFV 12 to open and allow flow through. The external wiring harness 38 will be discussed in more detail below.

The hot and cold water 8 exiting the hot and cold ODFFV exit ports 40 may be combined in a mixer 42, as shown, and run through a single hose 10 to the appliance 4. Alternatively a separate hose 10 for each ODFFV exit port 40 may be provided to carry water 6 from the ODFFV 12 to the appliance 4. In the single hose 10 embodiment shown, the hot and cold water 6 is combined in the mixer 42 immediately after the hot and cold water valves 14. The water 6 will preferably be at a low-pressure with two flow lines connecting at the mixer 42.

In a separate dual hose embodiment, the ODFFV exit ports 40 may each have their own hose 10. Each hose 10 would then attach to one of the hot or cold back wall ports 22 and flow to one of the hot or cold water valves 20 of the ISV 16. The benefit of using two hoses 10 is that less modifications need to be made to the routing of water 6 within the appliance 4. It is anticipated that the first adoption of the flood prevention device 2 will be with the dual hose 10 embodiment and then transition to the single hose 10 embodiment.

The manner in which the hose(s) 10 connect to the appliance 4 will vary based on the single or dual hose 10 embodiment, the routing through or around the ISV 16, and if an exclusive flow path in the appliance 4 for the ODFFV 12 supply hose(s) 10 to the tub 30 is proved.

If the ISV 16 is removed from the appliance 4 and a single hose 10 is used, the single hose 10 will connect directly to the tub 30 or an output hose 28 that empties into the tub 30. If a single hose 10 is used and the ISV 16 is present, a number of different arrangements, with different benefits and drawbacks, may be used.

In a first embodiment with the ISV 16 present, the water 6 travels from the mixer 42, via the low-pressure single hose 10, to the appliance 4, where it is routed to the existing output hose 28 or directly to the tub 30. The ISV 16 remains in the appliance 4, but does not need to function. In this and other embodiments when one of the two back wall supply ports 22 are not used, the unused supply port 22 may be capped off or used as an access for the ODFFV wiring harness 38 to enter the inside of the appliance 4.

In a second embodiment with the ISV 16 present and a single supply hose 10, an adaptor attachment 32 may be used between the active back wall supply port and the input of the hot and cold valves 20 of the ISV 16. In this manner the water 6 is delivered through a single "active" back wall supply port 22 and then the flow is split at the adapter 32. If the cold water valve 20 of the ISV 16 opens, water 6 flows from the adapter 32 to the cold water valve 20 of the 16 ISV, and similarly with the hot water valve 20 of the ISV 16.

In a further embodiment, an "H" bridge 44 connection may be disposed adjacent the inside back wall 46 of the appliance 4 in proximity to the back wall supply ports 22, connecting the cold water inlet hose 24 to the hot water inlet hose 24 at a location upstream of the ISV 16, the cold inlet hose 24 running from the cold supply port 22 to the cold water valve 20 of the ISV 16 and the hot water inlet hose 24 running from the hot water supply port 22 to the hot water valve 20 of the ISV 16. A selector valve 48 would be located at the intersection of the bridge connection 44 to either the cold or hot inlet hoses 24. If a single supply hose 10 is used, and is fastened to, for example, the back wall hot water supply port 22, the selector valve 48 would be located at the intersection of the bridge connector 44 and the cold water inlet hose 24. The selector valve handle 50 would be turned to a Single Port Flow setting/direction (FIG. 2) to open flow from the bridge 44 to the cold water inlet hose 24 downstream of the selector valve 48, and the cold water inlet hose 24 upstream of the selector valve 48 would be closed off. This would allow the mixed fluid 6 from the single hose 10 to flow through the back wall hot water supply port 22 through the hot water inlet hose 24 into the hot water valve 20 of the ISV 16 when that valve 20 is open. Mixed fluid 6 would flow through the back wall hot water supply port 22, through the bridge 44, through the selector valve 48, through part of the cold water inlet hose 24 and into the cold water valve 20 of the ISV 16 when that valve 16 is open. Finally, mixed fluid 6 would flow through the full hot water inlet hose 24 and the bridge 44 and part of the cold water inlet hose 24 when both hot and cold valves 20 of the ISV 16 are open, all while preventing fluid 6 from flowing out of the appliance 6 through the back wall cold water supply port 22. If, on the other hand, the user elects for whatever reason not to use just a single hose 10, the selector valve 48 would be switched to the Dual Port Flow setting/direction (FIG. 3) to close flow from the bridge connector 44 to the cold water inlet hose 24 and to open the flow from the cold water inlet hose 24 upstream of the selector valve 48 to the cold water inlet hose 24 downstream of the inlet valve 48. This would prevent water 6 from the hot water inlet hose 24 from entering the cold water inlet hose 24 and would allow a normal dual supply hose 10 hookup to the appliance 4. This selector valve 48 may be electronic or manual, and the selector lever/switch 50 or buttons may be placed on or extend through the back 46 of the appliance 4, or under a door or cover to prevent accidental actuation. An appliance 4 with this embodiment can easily transition from non-flood prevention device 2 function (or non-single hose 20 flood prevention device 2 function) to flood prevention device 2 function with a turn of the selector switch 50.

In yet another embodiment, as shown in FIG. 4, the single hose 10 can be connected to one of the back wall supply ports 22, with an inlet hose 24 that that leads exclusively to one of the two valves 20 of the ISV 16, just for example, the hot water inlet hose leading to the hot water valve 20 of the ISV 16. In this embodiment, a wiring adaptor 52 would be mounted to the ISV so that electric signals from the ACU 26 to actuate the hot water valve 20 of the ISV 16 would actuate only the hot water valve 20 of the ISV 16, and electric signal to actuate the cold water valve 20 of the ISV 16 would actuate only the hot water valve 20 of the ISV 16. Electric signals to actuate both the hot water valve 20 of the ISV 16 and the cold water valve 20 of the ISV 16 would only actuate the hot water valve 20 of the ISV 16, preferably opening the hot water valve 20 of the ISV 16 to a magnitude that is equal to the sum of the requested opening magnitude of hot water valve 20 of the ISV 16 plus the requested opening magnitude of the cold water valve 20 of the ISV 16. The cold water valve 20 of the ISV 16 would stay closed during all these demands, preventing backflow from the output hose 28 back through the cold water valve 20 of the ISV 16 and out of the cold water back wall supply port 22. Additionally, a fluid tight cap 54 may be attached to the unused back wall supply port. This embodiment would keep the unused valve 20 of the ISV 16, in this example the cold water valve 16, closed while still delivering hot, cold, or mixed water to the output hose 28 through just one valve 20 of the ISV 16, as demanded by the ACU 26.

In another alternative embodiment using a single supply hose 10 and with the ISV 20 retained, as shown in FIG. 5, a "Y" adaptor 56 may be installed on the outside of the appliance 4, fluidly connecting the hot water and cold water back wall supply ports 22, and providing a single new port 58 exterior to the appliance to which the single supply hose may be attached. This exterior "Y" adaptor 56 would be particularly beneficial in allowing users to easily convert a washing machine 4 to function with the flood prevention device 2.

In a further embodiment, as shown in FIG. 6, there may be a third back wall supply port 60 provided on the back 46 of the appliance 4 exclusively for the single external supply hose 10. This third back wall supply port 60 would preferably direct fluid flow from the single supply hose 10, circumventing the ISV 16, to an exclusive output hose 62 discharging to the tub 30. Alternatively the third back wall supply port 60 would direct fluid flow to the same output hose 28 as used by the ISV 16, with a one way valve of check valve 64 disposed in each of the ISV portion of the output hose 28 and the ODFFV portion of the output hose 28, upstream of the intersection of the ISV portion 28 and the ODFFV portion of the shared output hose 28.

Turning now to FIG. 7, an embodiment is shown with dual supply hoses 10 and the ISV 16 still present and active. Each of the two supply hoses 10 are attached to the appropriate back wall supply port 22. By making use of two hoses 10, this embodiment potentially increases material costs, but does not require any internal adaptors or internal valves to ensure proper function.

Turning to FIG. 1, a wiring harness 38 is shown electrically connecting the ACU 26 to the ODFFV 12 to control the operation of the ODFFV 12. The wiring harness 38 is designed in length to extend from the ODFFV 12 to an ACU electrical connection 66 at back of the appliance 54 (as shown in FIG. 8) or at a location inside the appliance 4. The wiring harness 38 preferably plugs into the ODFFV 12 with, for example, an electrical square plug connection, to facilitate delivery of electrical signals/current to each of the hot water and the cold water valves 14 of the ODFFV 12, to initiate the opening of the hot water and the cold water valves 14 upon demand. The wiring harness 38 allows the ACU 26 to seamlessly control the ODWVF 12 without the need to install a separate control unit for controlling or powering the ODFFV 12. This is accomplished by transmitting an electrical signal of the ACU 26 for control of the respective hot water and cold water valve 20 of the ISV 16 to a respective one of the hot water or cold water valve 14 of the ODFFV 12, via the wiring harness 38. Thus, when the ACU 26 sends a demand signal for the hot water or cold water valve 20 of the ISV 16 to open, the signal will be transmitted through the wiring harness 38 wires to the appropriate hot water or cold water valve 14 of the ODFFV 12 causing the signaled valve 14 to open and fluid 6 to flow from the mainline source 8, through the appropriate valve 14 of the ODFFV 12, into the appliance 4, through the appropriate valve 20 of the ISV 16, and into the tub 30. When the ACU 26 determines sufficient fluid 6 has been delivered, the ACU 26 de-energizes current, causing both the respective valve 20 of the ISV 16 and valve 14 of the ODFFV 12 to close, stopping the flow of the fluid 6 from the mainline 8 and into the appliance 4.

An effective length of the wiring harness 38 is preferably, for example, around 4 inches shorter than an effective length of the supply hose(s) 10. The effective length is the farthest length from the ODFFV 12 to the respective portion of the wiring harness 38 or the supply hose 10 that attaches to the back wall of the appliance 46, or an equivalent location on a wiring harness 38 or supply hose 10 that passes through the back wall of the appliance 46 without connecting to it 46. Further, the connection between the wiring harness 38 and the ODFFV 12 and/or the connection between the wiring harness 38 and a plug 66 at the back of the appliance 46 is preferably removable with simple pulling force. By making the effective length of the wiring harness 38 shorter than the effective length of the supply hose 10, and making at least one end of the wiring harness 38 connection easily disengageable, an extra safety feature is presented. If the appliance 4 is moved and stress is put on the on the hose 10, the wiring harness 38, being shorter than the hose 10, will unplug, breaking the electrical connection and causing the valves 14 of the ODFFV 12 to close or remain closed and the appliance 4 to be inoperable until reconnected. To reconnect the wiring harness 38 though, the stress will first be taken off the supply hose 10 by, for example, positioning the appliance 4 closer to the ODWVF 14, and thus allowing the wiring harness 38 to reconnect. There are multiple embodiments for electrically connecting the wiring harness 38 from the ODFFV 12 to the ACU 26.

In a first wiring harness 38 connection embodiment the wires in the wire harness 38 are connected directly to the appliance control unit/timer 26, as shown in FIG. 9. In a second wiring harness 38 connection embodiment, shown in FIG. 10, the wiring harness 38 is connected to existing internal appliance control wires 18 located inside the appliance. If the ISV 16 is removed from the appliance 4, the wiring harness 38 may be connected directly to the internal appliance control wires 18 that formally connected to the ISV 16. The wiring harness 38 wires that electrically connect to the hot water valve 14 of the ODFFV 12 will connect to the internal appliance control wires 18 that were connected to the hot water valve 20 of the ISV 16. Similarly, the wiring harness 38 wires that electrically connect to the cold water valve 14 of the ODFFV 12 will connect to the internal appliance control wires 18 that were connected to the cold water valve 20 of the ISV 16.

If the ISV 16 is retained within the appliance 4, the wiring harness 38 wire contacts 68 may be connected, via a plug-on connection 70, between the ISV 16 (male) contacts 72 and the electrical contacts 74 (female) of the internal appliance control wires 18. This plug-on wire contact connection 70 is female on one side, and male on the opposite side, with an additional male contact to facilitate the wiring harness 38. The plug-on connection 70 becomes a "piggyback," off of the electrical connection 74/72 to the ISV 16. The ISV 16 maintains current flow as designed, and now there is also current flow through the wiring harness 38. Thus when the ACU 26 sends a demand to open, for example, the cold water valve 20 of the ISV 16, both the cold water valve 20 of the ISV 16 opens and the cold water valve 14 of the ODFFV 12 opens. In a variation of this embodiment, an adaptor is provided to boost current and/or voltage of the signal from the ACU 26 to the ISV 16 and/or the ODFFV 12, based on a parallel or series connection between the ISV 16 and the ODFFV 12, to offset any undesired voltage or current drop from introducing the ODFFV 12 into the ACU-ISV 26-12 circuit.

In a further embodiment, the appliance 4 will have an electrical attachment or plug-in connection 66 on the exterior of the appliance 46 that the appliance wire contacts 68 of the external wire harness 38 may be simply plugged into, as shown in FIG. 8. The plug-in connection 66 will be electrically connected to the appliance control unit/timer 26 directly or, as shown in FIG. 8, in parallel or series with the ISV 16 via a jump connection 76. A similar plug-in connection can also be present on the ODFFV 66 for the wiring harness 38 to plug into. The plug-in connection 66 can take be in multiple embodiments. As one example shown in FIG. 12, the wiring harness 38 can have a plug contact 68 that plugs into a socket on the external surface of the back wall 46 of the appliance 4. The ACU 26 would be electrically connected to the socket 66 via a jump connection 76, for example. As another example, shown in FIG. 13, the wiring harness 38 can have a socket contact 68 that engages a plug 66 protruding from the external surface of the back wall 46 of the appliance 4. The plug 66 can be in a recessed portion 78 of the exterior surface of the back wall 46 or extend from the plane defined by exterior surface of the back wall.

To aid in allowing the wiring harness 38 and appliance 4 electrical connection 68/66 to readily disengage, the appliance portion of the connection 66 may be mounted on a swivel. This way, if the harness 38 is pulled at an angle parallel to the outer surface of the back wall 46, that is, perpendicular to the plug in direction, the plug 68 may be easily disengaged and not damaged as might happen otherwise. Such a swiveling socket 66/plug 38 would facilitate trouble-free, non-damaging disengagement from any direction.

Another embodiment that would aid in ease of multi-directional disengagement, as shown in FIG. 14, is if a flat, disc like harness electrical contact 80 that is retained in place on the appliance 4 primarily via a magnetic engagement with a circular appliance electrical contact 82. One of a portion of the wireless harness disc electrical contact 80 and a portion the circular surface electrical contact 82 of the appliance will be a permanent magnet 84 and the other will be a magnetic material 86, or portions of both 80, 82 will be a permanent magnet 84. This magnetic retention is in contrast with a primarily friction retained connection as with the plug and socket connection 66/68. This magnetic embodiment provides a strong and stable connection while also allowing a quick and damage free disengagement if the wiring harness 38 is pulled from any direction. A shallow nub 86 on the appliance electrical contact 82 and a mating shallow indentation 88 on the wireless harness electrical contact 80, or vice versa, would provide a centering element for the two portions of the magnetically retained electrical connection 80/82 and increase the surface area for electrical conduction.

While many washing machines 4 have only one hot water valve 20 and only one cold water valve 20 of the ISV 16, some have more than one valve 20 of the ISV for hot water and/or cold water. For such machines, a wiring converter would be used to convert an ACU 26 signal for opening any of the hot water valves 20 of the ISV 16 to the hot water valve 14 of the ODFFV 12 and would convert an ACU 26 signal for opening any of the cold water valves 20 of the ISV 16 to open the cold water valve 14 of the ODFFV 12. This converter may include a directional current diode to prevent electrical current from the ACU 26 from looping around one of the plurality of hot water or cold water valves 20 of the ISV 16 jointly connected to the respective hot water or cold water valves 14 of the ODFFV 12. Using the existing internal control unit 26 provides significant advantages in cost reductions and reliability.

Turning now to FIG. 15, a further embodiment is shown where in place of the wiring harness 38, the ODFFV 12 may be controlled by remote control 90 wireless 92 activation. In this embodiment, an ODFFV 12 remote receiving or receiving/transmitting unit 90, referred to as ODFFV remote receiving unit 90 for simplicity, is electrically installed in place of the wiring harness 38 in the previous embodiment. The APC 26 or a home electronic control unit (ECU) 94 has a transmitter or transmitter/receiver 96, referred to as ACU transmitter for simplicity, that communicates with the ODFFV remote receiving unit 90. When a hot fluid or cold fluid flow 6 is demanded by the ACU 26, an appropriate demand signal 92 is sent from the ACU transmitter 96. The ODFFV remote receiving unit 90 activates the appropriate valve 14 of the ODFFV 12 when a signal 92 is received. The ODFFV remote receiving unit 90 and the solenoid valves 14 in this embodiment may be powered by separate household current, the appliance, and/or one or more batteries 98.

It is to be noted that the ODFFV 12 Flood Prevention Device 2 described above is designed to function with other appliances 4 besides washing machines 4, and to prevent "floods," or unintended release of fluid 6, including oil/heating oil and propane/natural gas as well as water. The appliances 4 include, for example, refrigerators, dishwashers, gas dryers, evaporative coolers, oil and gas furnaces, gas stoves, water heaters, and any other appliance 4 or device that receives pressurized fluid, like oil, water, or gas delivery from a mainline source 8. With some appliances, for example a gas powered hot water heater, an ODFFV may be provided on each of the natural gas line 8 and the water line 8. In one embodiment, independent plumbing coded compliant external single valve 14 solenoid ODFFV 12 and plumbing fitting 32 are mounted to the appliance pressured fluid source 8. The plumbing apparatus is intended for ease of use with hose ends to facilitate customers. Common and existing hoses 10 are attached to the outlet port 40 on the ODFFV 12 and to the inlet existing fitting(s) on the appliance 22 leading to the single valve 20 appliance solenoid ISV 16. A wiring harness 38 electrically connects the ODFFV 12 to the appliance 4 as described above. In functionality, as the appliance 4 ACU 26 sends an electrical signal demand for the appliance ISV 16 to open to provide fluid 6 to the appliance 4, both the internal solenoid valve 16, 20 and external solenoid valve 12, 14 open at the same time. There is no high pressure water 6 or gas 6 in the supply hose 10 from the ODFFV 12 to the ISV 16, only flow pressure. When the appliance 4 ACU 26 terminates the electrical signal demand, the ISV 16 and the ODFFV 12 close, terminating fluid 6 delivery without a pressure surge or retained high pressure in the supply hose 10. This application provides a redundancy of two sets of solenoid valves 12, 16, and an ease of installation for existing appliances 4.

Turning next to FIG. 16, another element of the flood prevention device 2 is shown. In this embodiment, fluid 6 such as water, gas, or oil, is shut off to, for example, a water heater or other appliance 4 if the fluid(s) 6 is detected leaking from the appliance 4. A solenoid valve 100 is positioned just after the main shut off valve 102 to, in this example, the water heater 4. The solenoid is an Extended On or Power Off Fluid Flow Valve (POFFV) 100 that is designed to remain in an on or open position for extended periods of time without power, and is energized to transition to a closed or off position, and is explained in greater detail below. A leak sensor 104, for example a pad with sensors, is electrically connected to the valve 100 and an electrical power source 106, such as a battery. An electrical switch 108 is positioned or integrated so that current does not flow to the POFFV 100 to close the valve 100 unless a leak is detected, (e.g., a short is present in pad sensor 104 from water on the pad 104) and the switch 108 directs the current to the valve 100. Reset would preferably require disconnecting of the electrical source to ensure the leak was addressed. The POFFV could also be designed with a position sensor 110 and a microprocessor 112 such that when the position sensor 110 detected the POFFV 100 was in a closed position, the microprocessor 112 stops the current from flowing to the POFFV 100, to conserve power and to prevent overheating.

The leak sensor 104—POFFV 100 embodiment of the Flood Prevention Device 2 can be used with a variety of appliances 4, including refrigerators, dishwashers, gas dryers, evaporative coolers, gas furnaces, gas stoves, water heaters, heating oil powered furnaces and heaters, and any other appliance or device with pressurized fluid 6 (e.g., water/gas/heating oil) delivery systems from a mainline source 8. For gas appliances 4, a gas sensor 104 would be used to detect gas 6 and then shut off gas 6 at the gas main 8 and/or at the closest gas appliance(s) 4 to the sensor 104. For heating oil 6 leaks, an oil vapor or liquid oil sensor 104 would be used to detect an oil 6 leak and then shut off oil 6 to the appliance 4 at the oil line 8, at the appliance 4, or at the oil tank.

An additional embodiment of the leak sensor 104—POFFV 100 flood prevention device 2 shown in FIG. 17 provides for shutting off the main fluid source 8, e.g., water, of the home 114 if any remote fluid sensors 104 detect such fluid 8 leak. In the water 8 example, a POFFV 100 is positioned at the main line pressure water source 8 with electrical power, like a battery 98, attached. A switch 116 is connected to the valve with a remote control receiver 118. Preferably the receiver 118 is a low wattage receiver with an extended delivery battery 98. The switch 116 directs electrical current to the POFFV 100 if a remote signal 92 is received. Remote fluid sensors 120 (e.g., sensor pads) are located throughout the facility 114 where water leaks may be detected. Each remote fluid sensor 120 has a remote transmitter 122 that is battery 98 or household current actuated. If water 6 is detected by the remote sensor 120, a signal 92 is transmitted that is received by the receiver 118, which then sends electrical current to the solenoid valve 100, shutting the main water 8 off. It is also envisioned that a transmitter booster 124 is electrically connected or plugged into the household electric current. The transmitter booster 124 receives transmitted signal 92 from the remote sensor pads 120 and relays the signal 92 with more power to be received from the receiver 118 at the POFFV 100. The transmitter booster 124 allows the sensor pad transmitter 122 and the POFFV receiver 124 to both operate at lower power. A remote transmitting/receiving house ECU 94 can also track and coordinate wired and remote leak sensors 104, 120, act as a transmitter 96 to the POFFV receiver 118, and/or as a transmitter booster 124 to boost transmissions 92 from the remote sensor pads 120.

Another variation of the leak sensor—POFFV 104,100 flood prevention device 2 protects or minimizes flooding from a toilet 126. In addition to the water sensors 104 and POFFV 100 discussed in this portion of the application, specialized sensors and shut off mechanisms will be discussed further below.

The POFFV 100 can preferably remain in a stable open/on position without the application of any electrical power. With the application of a brief, preferably low power, current of electricity, the POFFV 100 transitions to a stable off/closed position that remains closed without the application of any additional electrical power. The POFFV 100 has the advantage that the valve 100 is maintained open to allow fluid 8 flow with substantially no power drain over long periods of time. The POFFV 100 is preferably manually reopened with a manual lever 128 though the valve 100 could be opened via electromagnetic actuation.

In one embodiment, the POFFV 100 is a spring 36 biased off/closed valve that is releaseably latchable to maintain an on/open position. The POFFV 100 is latched open in normal operation. The solenoid portion 34 of this POFFV 100 is a latch disengagement actuator 130 for the latch 132. The valve cylinder 14 itself does not require a solenoid 34 to act in opposition to the spring 36 bias to maintain an open/on position. When the water sensor 104 senses water 6, electric current powers the actuator 130 to release the latch 132 and the spring 36 forces the valve 100 closed, shown in FIG. 19. This embodiment has the benefit that only a short and small amount of electrical energy is required to actuate the latch 132 release, and thereby allow the spring 36 to close the valve 100. The valve 100 is preferably manually reset/re-latched open via, for example, a lever 128, when the user desires to allow fluid 6 to again flow through the valve 100, shown in FIG. 18. In an additional embodiment, for example when integrating with a house ECU 94, an additional solenoid 34 may be include to reset the valve, applying force opposite to the spring 36 to move the valve 100 in an opening direction until the latch 132 catches the cylinder 14 and thus maintains the valve 100 in the open position.

In a second embodiment, Shown in FIG. 16, the POFFV 100 is spring 36 biased on or open with a spring loaded latch 132 that automatically releaseably latches the POFFV 100 closed when a solenoid 34 is energized and drives the valve 100 to a closed position. The latch 132 maintains the POFFV 100 in closed state with no additional supply of power. The POFFV 100 of this embodiment is unlatched, spring 36 biased open/on in normal operation. The solenoid 34 of this POFFV 100 acts against the spring 36 to drive the cylinder 14 closed when energized. When the cylinder 14 closes, a latch 132 automatically releasably latches the valve 100 closed. The valve 100 is preferably manually reset, that is the latch 132 is manually un-latched, allowing the valve to spring 36 bias back open, when the user desires to allow fluid 6 to again flow through the valve 100. Alternatively, the latch 106 may also be solenoid 34 actuated open to allow the valve 100 to spring bias open, as may be directed by a house ECU 94. In one variation, for added safety, a water sensor 104 may be connected to a gas valve 100 along a gas mainline to shut off the gas supply 6 to the gas appliance 4.

It is noted that the ODFFV 12 and the POFFV 100 in this application may have solenoids 34 in place of the springs 36, so that less force is required to move the solenoids 34 against a spring 36 bias, when such directional movement is required, and a latch 132 then would not necessarily be required for the POFFV 100. For springless embodiment of the ODFFV 12, a backup power source or battery 98 would preferably be supplied so that if the wiring harness 38 was removed, the ODFFV 12 would detect the disconnection and the backup power source 98 would close the ODFFV 12.

As shown in FIG. 20, the sensors 104 for detecting leaks may be directly wired to the POFFV 100. In such embodiments the water sensors 104 can be placed in a serial connection along the circuit between the power source 106 and POFFV 100. Thus, when water 6 is detected, the switch 108 closes the circuit and the POESV solenoid 34 is energized to close the valve. Alternatively, as shown in FIG. 17, the leak sensors 104, 120 may have a wireless connection 92 with the POFFV 100, with each having an independent power source 98 or both sharing power 106, 98. The power source 106 may be the household current, accessed directly or routed through an appliance, or may be a battery 98. The wireless connection 92 may be used when the leak detector 104, 120 is spaced from the POFFV 100, as may be the case for a natural gas leak detector 100. It is noted that there may be a wireless connection 92 for transmitting leak detection signal and a wired connection for power purposes.

The water sensors may take the form of a number of embodiments. In one embodiment, shown in FIGS. 16, 20, and 21, the sensor 104 has a ground plate 134, conductors to power source 136, conductors to the POFFV 100 and preferably an alarm 140. In the linear water sensor 104 of the embodiment shown in FIG. 21, the length or width of the ground plate from the lead wires 142 can be cut or shortened without interrupting the conductivity. When leaked water 6 is present on the conductors 108, the water 6 completes the ground between the conductors 6. The sensor 104 is designed to be able to be cut or shortened to any length to the top of the ground plate 134 without disrupting the water sensing capability. This embodiment of the water sensor 104 may even be wrapped around water supply hoses 10 to detect any leak that may form in such hose 10 before the leak becomes a major problem or would be detected by human eye. One benefit of routing the ground through the sensor 104 is that the danger of accidental shock of the user or fire is greatly reduced.

A second embodiment of the water sensor, 104 shown in FIG. 22, is a flexible cord or rope 144 that can be cut to desired length. The conducting ground to the POFFV 100 and to the power source 106 are adjacent to but insulated 146 from one another, but are also exposed along a perimeter of the rope or cord 144 to the outside environment. In this way, when leaked water 6 is present on the rope 144, the rope 144 will form an electrical connection between adjacent wires 136, 138 completing the ground between the conductor wires 136, 138 and thus between the POFFV 100 and the power source 106. This embodiment may also be cut to length without disrupting water sensing abilities.

In a third embodiment of the water sensor 104, shown in FIG. 23, the water sensor 104 includes a circular water conducting ground 148, including conductors to the power source 136 and conductors to POFFV 138 adjacent but spaced from one another on the circular pad 148. In addition to a circle shape, this embodiment may be any shape, with conducting wires 136, 138 spiraling inward in pairs, or otherwise covering the surface of the pad 148 such that the power source ground wires 136 are adjacent but not in electrical contact with POFFV ground wires 138 for the vast majority of the pad, while being more spaced only a minimal portion of the pad 148 if at all. The power source ground wires 136 wires should not be electrically connected to the POFFV ground wires 138 for any of the pad 148, so that a short caused by water 6 is the way that the electrical connection between the two ground paths 136, 138 are made.

Other sensors 104 may be used to detect water, gas, or oil, such as those commonly known to the art. These sensors 104 would preferably include a microchip to close the ground when water or other fluid 6 is detected or otherwise detect the fluid 6, and activate the POFFV 100 directly or wirelessly.

As shown in FIG. 21, in addition to closing the POFFV 100, alarms 140 are preferably triggered when a leak is detected. An alarm 140 is also preferably triggered when the wiring harness 38 to the ODFFV 12 is disconnected. Such alarms 140 include audible alarms, LED light alarm, and electronic or wireless signals 92 to a personal computer, phone, mobile electronic communications device and/or household ECU 94. A multiple alarm 140 being triggered—for example, a high decibel audible alarm (e.g., greater than 75 or 85 decibels) and a signal 92 to computer/phone/mobile device/household ECU 94—is especially beneficial when the fluid 6 leak is potentially deadly/explosive, like a heating oil or natural gas leak, or if the fluid 6 leak is in a room removed from normal use, like the attic or basement, that might take longer to discover in the normal course of events.

After the current from the fluid sensor 104 has activated the POFFV 100 to close, the power to the solenoid/motor 34 at the POFFV 100 will preferably cease. The circuit may include a switch (not shown) such that the alarm 140, once activated, may continue to receive power and function.

As shown in FIG. 24, a further embodiment of the water sensors 104 allow for automatic electrical disconnection of the ODFFV 12 if water 6 is sensed on a sensor or sensor pad 104 positioned, for example, at or below a water supply hose 10 or water receiving appliance 4, thereby automatically closing the ODFFV 12. Two wires, positive and neutral are mounted closely next to each other in a water sensor pad 104. The wires are connected to the wiring harness 38 described in the ODFFV 12. An electrical breaker or fuse 150 is mounted on the wiring harness and/or the wires of the water sensor 104. The wires of the water sensor collection pad 104 will be electrically charged when there is ACU 26 electrical demand. If water 6 is introduced to the water sensor pad 104, an electrical short will occur, trigger the breaker or fuse 150, shutting off current to ODFFV 12.

Variations to this embodiment allowing for automatic shut off of the ODFFV 12 follow. For appliances 4 with ODFFV 12, the sensor 104 can cause a break in the circuit that powers the ODFFV 12 causing the ODFFV 12 to close, including via the fuse variation above. Additionally, the sensor 104 can energize a latch 132 on the ODFFV that retains the ODFFV 12 in the off position. This can be a bolt that engages a recess in the ODWVF cylinder from the side or retains the cylinder from one axial end, or the retention element can be a spring biased latch 132 that was retained in an unengaged position and when released by a solenoid 34, for example, the latch 132 would latch into a recess on the ODFFV cylinder or retain the cylinder from above.

Additionally, as shown in FIG. 17, the leak sensor 104 may be integrated with a household ECU 94. Though FIG. 17 shows the POFFV 100 on the mainline 8, the household ECU 94 could also communicate with and control a POFFV 100 proximate to an appliance 4, as in FIG. 16. The leak sensor 104 may communicate directly or wirelessly 92 with the household ECU 94 when a leak is detected. The household ECU 94 can then directly or wirelessly 92 communicate and/or power the POFFV 100 to close fluid 6 flow that was detected as leaking. The household ECU 94 embodiment would then preferably wirelessly send an alert signal 92 to the user of the leak. The household ECU 94 embodiment is also advantageous when the source of the leak may be indeterminate, for example if it was detected at a distance from an appliance 4 or POFFV 100. In such an instance, the household ECU 94 could send a direct or wireless 92 power off signal to a number of POFFV 100 in the house 114 in proximity to the leak sensor 104. Alternatively, the household ECU 94 could send a power off signal to a household mainline POFFV 100 for the fluid 6 (water, gas, oil) to close the household supply for the fluid 6 at the fluid source 8, ensuring that the fluid 6 leak of indeterminate origin was nonetheless stopped. If the leak detected is a gas 6 leak, the household ECU 94 could also wirelessly 92 alert the local gas company to investigate. If a high concentration of gas 6 is detected (approaching an unhealthy or toxic level or in danger of combustion level), the household ECU 94 could also automatically open the windows to the house 114 or otherwise force ventilation to remove the gas 6 from the building 114 and/or dilute the gas 6 in the building 114.

Turning now to FIG. 25, a further embodiment of the flood prevention device 2 is shown. In this embodiment the flood prevention device 2 detects water 6 as it is about to overflow a toilet with an overflow detector 152 and/or after it has overflowed with a water sensor, and once the water is detected the device automatically shuts off water flow. In one variation of the embodiment, the overflow detector 152 and/or water sensor 104 completes an electrical ground between a power source 106 and a POFFV 100. The device has a power supply 106, which provides positive (+) current to an audible alarm 154, an LED signal light 156, and to the POFFV 100. The audible alarm 154 and LED signal light 156 may be part of the same alarm unit 140, as shown in FIG. 25, or may be separate units. Ground from the power source 106 is directed to the overflow detector 152 and/or water sensor 104, which, if both are included, would preferably be placed in parallel with one another in the circuit. In a parallel arrangement, ground is completed when either (a) the overflow detector 152 detects an imminent overflow condition, by, for example, a float 158 rising to contact ground completion contacts 160, 162, or (b), the water sensor 104 senses an overflow condition has occurred by, for example, water landing on the sensor contact wires 136, 138. When the ground is completed to the POFFV 100, the 140 alarm and the LED 156 are activated and the POFFV 100 is simultaneously energized, closing the valve 100 and stopping water 6 flow to the toilet 126. The POFFV 100 preferably also provides the option to immediately shutoff of water 6 flow by manually actuation, for example, releasing the catch on a releaseably latched open, spring biased off POFFV 100, such as the POFFV shown in FIGS. 18 and 19. After the overflow is corrected and water 6 is removed from the water sensor 104 the POFFV 100 may be manually reset. The POFFV 100 and the water sensors 104 may be consistent with those discussed in previous embodiments above.

The toilet overflow detector 152 is designed to detect water 6 level reaching an imminent overflow state, for example within an inch or less of the rim 164 of the toilet. The overflow state being a state when the bowl 166 of the toilet 126 is filled to overflowing the toilet 126. The overflow detector 152 can take the form of any of multiple embodiments or more than one embodiment in the same toilet 126 for redundancy.

A first embodiment of the overflow detector 152 is a float 168 actuated detector 152 mounted on the inside rim 164 of the bowl 166. Housing brackets 170 hang on toilet bowl rim 164 and provide a support for the float housing 172, which contains two spaced apart ground contacts 160, 162 and a float 168. The float 168 includes a float ball 174, a float ball stem 176 mounted on the float ball 172, and a solid conductive contact 178 at the top of the float ball stem 176. At the top of the housing 172 are the two spaced apart ground contacts 160, 162. One ground contact 160 is electrically connected to the ground 138 of the POFFV 100, the alarm 140, and the LED 156 and a second ground contact 162 is electrically connected to the ground 136 of the power source 106. When the bowl water 6 rises to imminent overflow level, the float 168, and thus the solid contact 178, rises to the spaced negative or ground contacts 160, 162 and touches both the negative contacts 160, 162 providing conduction between the two. This completes the ground in the circuit, sounding the alarm 140, 154, turning on the LED light 156, and energizing and shutting off water 6 flow through the POFFV 100. This embodiment uses direct wire and ground connections, and does not require any integrated circuits to function. In the simplest version of this embodiment, no integrated circuits are provided. In other versions, especially those including wireless transmission 92 and/or reception, integrated circuits will preferably be provided. In this float ground 168 embodiment, the contacts 160, 162, via two negative wires 136, 138, complete the negative ground from battery 106 to the detector 152, alarm 140, 152, LED light 154, and actuates the POFFV 100 close. Positive connection from battery 106 to the accessories 100, 140, 152, 154 is continuous and in one embodiment, they are only actuated when the negative connection is complete, via the float 152 or water sensor 104 accessories. Float depth may be adjustable with a "screw" rotation of the float ball shaft 176—spacing the solid conductive contact 178 further or closer to the float ball 174. The float ball 174 does not need to the ball shape shown in FIGS. 26 and 27, and the float ball shaft 176 may be omitted with the solid conductive contact 178 placed directly on the float ball 174. The float ball 174 could be flattened and shaped as, for example, a rectangular prism. The housing 172 could be shaped similar in size and shape to a lateral perimeter of the float ball 174 to allow the float ball 174 to float to move up and down, while maintaining one surface in the upward direction. In one embodiment, the housing 172 has a retainer 180 below the float 168 that prevents the float 168 from falling out of the housing 172, but still allows water 6 in the housing 172. In one embodiment, entire housing 172 can be one to two inches in height, one to two inches in width, and half and inch to an inch in depth.

Turning to FIGS. 28-30, a second embodiment of the overflow detector 152 is shown. In this embodiment, the overflow detector 152 comprises a stationary overflow detector 182 located in an upper portion of the detector housing 172 to detect water 6. In contrast to the float actuated detector 168, the stationary detector 182 does not require moving parts to detect the imminent overflow state. In a first variation of the stationary detector 182 embodiment, shown in FIGS. 28 (front view) and 29 (top view), the stationary detector 182 can include two spaced apart but adjacent wires 184,186, preferably partially shielded by the housing 172, but is open to rising water 6. In this first variation, one of the adjacent wires 186 is electrically connected to the ground wire 136 of the power source 106 and the other adjacent wire 164 is electrically connected to the ground wire 138 of the POFFV 100. When water 6 rises and reaches the spaced adjacent wires 184, 186, the water 6 shorts the circuit. Other embodiments of the stationary detectors 182 may be used, as described below.

A second version of the stationary detector 182 has a flat non-conducting surface and two prongs 190, 192 extending downward. All the rest of the circuitry 194 can be isolated from the water 6, with just the two spaced conductive prongs 190, 192 extending preferably downward. The first prong 190 would preferably be electrically connected to the POFFV ground 138 and the second prong 192 would be electrically connected to the power source ground 136. When water 6 reaches the height of the two prongs 190, 192, the water 6 creates an electronic connection between the two prongs 190, 192, completing the circuit. Like the first variation of the stationary detector 182 embodiment of the overflow detector 152, this second variation is easy to clean, aesthetically pleasing, and has no moving parts to malfunction. Though two prongs 190, 192 are preferred, a plurality of prongs 190, 192 may be provided, including five, ten, and even up to twenty or more, with a first portion of the plurality 190 electrically connecting to the POFFV ground 138 and the second portion of the plurality 192 connecting to the power source ground 136. The more prongs 190, 192, the more potential connections between the grounds 136, 138 and potentially the more sensitive the detector 152, but also the higher production costs, the greater likelihood of accidental short, and the harder to clean.

In addition to the passive detectors above 168, 182, that is, detectors 152 that do not normally draw current unless water 6 is detected, as shown in FIG. 31, active overflow detectors 196 may also be used, including light (or laser) sensors 198 using light (or laser) emission/detection to detect imminent water overflow. Active detectors 196 draw current to check if water 6 is present. The active detectors 196 can also be within the housing with a light emitter 200 and a spaced light detector 202 on opposing walls. When the light detector 202 detects a drop in light 204 striking the detector 202, as would happen if water 6 filled the portion of housing 172 between the light emitter 200 and light detector 202, the light sensor 198 would interpret the drop as an imminent overflow state. The active detector 196 would then directly or wirelessly 92 activate the POFFV 100. The active detector would include necessary electronics (not shown) for such emission, detection, determination, and signaling/activation. The drawback of active detectors 196 is that they draw current even when the overflow is not imminent. An advantage though, is that there are no moving parts and the light emitter 200 and detector 202 can both be positioned behind glass or the like, flush with the wall of the housing 172, and never need to come into direct contact with the harsh toilet 126 environment.

While the float actuated or stationary detectors 168, 182 can be exposed to the toilet 126 with minimal housing 172, some shielding from the caustic environment is desired. In one embodiment the hosing 172 substantially encloses the detecting element(s) 206 (e.g., float 168, conductive plates 160, 162, adjacent wires 184, 186, or prongs 190, 192, sensor 198) of the detector 152 on each lateral side and the top, with the housing 172 at least partially open on the bottom. This reduces the exposure of the detector 152 to the toilet 126 environment, but allows rising water 6 to enter the housing 172 from below and communicate with the float/conductive portions/sensor. As shown in FIG. 32, a recessed shield 208 can be provided inside the housing 172. The shield could be angled downward to allow any liquid to flow out under gravity, and could also include protruding shields 210 from the side walls of the housing 172. The recessed shield 208 would be positioned above the bottom opening and below the detecting element(s) 206 to prevent splashed water 6 or other liquid, solids, and cleaning elements from entering through the bottom opening, while still providing ready access for rising water 6 to enter the housing. A small vent or opening 212 around the top and preferably back of the housing 172, vertically above the detecting element(s) 206 may be provided to allow air to exit when rising water is entering. Where the multi-prong sensor is used, downward extending shields between the prongs may be provided to decrease likelihood of accidental activation.

In another embodiment, shown in FIG. 33, the housing 172 can be substantially closed on the bottom and three of the four lateral sides and the top, with the back of the housing 172 being at least partially open. The back being the side facing the circumference of the bowl 166. This design substantially blocks the detecting element(s) 206 of the overflow detector 152 from most of the caustic fluids in the toilet 126 environment, provides ease of construction, and provides a very astatically pleasing seemingly solid profile, which increases the likelihood of acceptance and continued use. With the opening at the back side of the housing, cleaning tools like toilet brushes and cleaning agents are also less likely to enter the housing 172.

In one variation of the open back of housing 172 embodiment, the housing 172 would be substantially completely open in the back with, preferably, a small downwardly extending internally recessed shield 208 along the back adjacent to the float/conductive portions to at least partially shield the float/conductive portions from splashes coming from the edge of the bowl.

In a second variation of this embodiment, shown in FIG. 33, the back wall of the housing 172 can be substantially closed, but have an opening 214 close to the base of the back wall, with the opening 214 large enough to allow rising water 6 to readily enter. This would aid in preventing non-water fluid 6 from entering while allowing any fluid 6 that enters to drain out. A shown, the interior base of the housing 172 can be slanted downward toward the opening 214 in the back to aid in draining fluid 6 out. As with the open bottom embodiment above, the back open embodiment may be provided with a vent 212 that allows air to exit the housing 172 as water 6 enters. As shown, the exit of the vent may be shielded by a vertical or slanting shield to prevent water from inadvertently entering, and the vent may have a sloped bottom interior surface to allow draining of any water that may enter.

As the housing 172 will be exposed to a caustic, high humidity environment, it is preferable that that the housing 172 be designed from materials that can withstand such an environment for a reasonable amount of time, say a year, and maintain functionality and structural integrity. Such materials include plastics, ceramic, and metals like stainless steel. The housing 172 may also have an anti-microbial coting to discourage microbial growth along the interior surfaces that may be difficult to clean, and along the exterior surface to reduce the need for vigorous cleaning of the exterior. Microbial growth in the interior of the detector could interfere with the conductivity of the conductive portions.

Turning now to FIG. 34, in addition to a power source 106, a toilet control unit (TCU) 216 can be provided. The TCU 216 may track overflows and imminent overflows, have wireless 92 capability to communicate with a household ECU 94 and/or the overflow detector 152, water sensor 104, and POFFV 100. The TCU 216 and power source 106 can be spaced from both the overflow detector 152 and the POFFV 100 and be located, for example, at the base of the tank/reservoir 218. Alternatively, the TCU 216 can be closely adjacent to either the overflow detector 152 or the POFFV 100. In wireless 92 embodiments, the overflow detector 152 will preferably have a longer term battery 98 that only needs to send a wireless signal 92 (which would draw down the overflow detector battery 98) via a transmitter 122 when the overflow detector 152 detects water 6 or when the battery 98 charge gets low. A transmitter/receiver 96 at the power source 106 or the TCU 216 would preferably be mounted on the back off the water tank reservoir 218, and receive signal 92 transmitted by the overflow detector 152. The TCU transmitter/receiver 96 will preferably have larger (e.g., more powerful and longer lasting) battery 98 than the overflow detector 152 or be connected to the household current. When the TCU transmitter/receiver 96 receives signal 92 of water overflow, the transmitter/receiver 96 will send signal electrically or remotely 92 to the POFFV 100 at the water source 8 and/or will force close shut the flapper valve passage 220 in a manner such as described below.

As shown in FIG. 35, an additional element of the toilet flood prevention device 2 includes a forced closed flush valve passage actuator (FCFVPA) 222 which blocks the flush valve passage 220 and stops water 6 from flowing out of the tank 218 through the flush valve 224 and into the bowl 166. This is especially beneficial because sometimes a toilet 126 may be unknowingly clogged. If the bowl 166 is already full or near full of water 6 but not to the imminent overflow state and the reservoir tank 218 is also full, when the user depresses the flush handle 226, the water 6 from the tank 218 may fill and overflow the bowl 166. This is because even if the overflow detector 152 detects water 6, shuts off the POFFV 100, and stops new water 6 from flowing into the tank 218 the water 6 that is currently in the tank 218 will continue to pass through the flush valve passage 220 until the tank 218 is substantially empty. The FCFVPA 222 will preferably be powered, directly or indirectly, by the same power source 106 as the overflow detector 152 and be connected in parallel with the alarm 140 or the POFFV 100 so that as soon as the ground is completed by the overflow detector 152 detecting water 6, the FCFVPA 222 is actuated and closes the flush valve passage 220 to water flow.

In a first embodiment of the FCFVPA 222 a spring biased 36 closed, releasably latched open valve flapper shutter 226 is disposed in the tank adjacent to the flapper. When the flapper shutter is energized, the latch 228 moves/releases the flapper shutter 226 and the flapper shutter 226 impacts the top of the flapper 230 in a downward direction causing the flapper 230 to shut and stop water 8 flow into the bowl 166. The flapper shutter 226 can be pivotally mounted and coil spring 36 biased in a manner such that when the flapper shutter 226 is triggered, the flapper shutter 226 impacts the flapper 230 in a similar rotational direction as the flapper 230 normally pivots downward. Alternatively, the flapper shutter 226 may be a linear, compression spring biased actuator 222 that strikes the top of the flapper 230 linearly in a substantially downward direction to close the flapper 226 and stop the water flow. Additionally, the pivot mounted and linear actuator embodiments 226 may be exclusively solenoid 34 actuated, without the need for springs 36. The flapper shutter 226 is preferably isolated in some manner from the water 6 in the reservoir tank 218 to prevent corrosion of the FCFVPA 222 parts.

In a second FCFVPA 222 embodiment, which has advantages in simplicity and functionality, a coil spring 36 with a long arm 232 is mounted at the pivot 234 of the flapper 230. The arm 232 extends along the drain tube 234, which is normally adjacent to the flapper valve 224. At the top of the arm a catch/release 228 is mounted. When the catch 228 is released/moved due to overflow detection, the arm 232 automatically spring rotates down to drive the flapper 230 down. Reset is simply a matter of moving the arm 232 back to the catch 228. This has the minimal opportunity to interrupt the existing components of the toilet 126. The catch/release 228 may a vertical sliding component, as shown, that extends from above the water line to below the water line, allowing for a spring arm 232 of similar size as the flapper 230, and would also allow for the solenoid 34 or motor that moves the catch 228 to be above the water line to prevent corrosion.

In a third embodiment of the FCFVPA 222, a vertical shaft 236, preferably mounted to the drain tube 234 or mounted to the side of the tank 218, with the mounting 238 preferably above the water 6 line, is driven down by spring bias 36 when actuated to strike and close the flapper 230. The shaft 236 may be driven vertically downward, or downward at a slight angle, to strike the flapper 230 substantially orthogonally on the top surface of the flapper 230. In a variation of this third embodiment (not shown), a plastic, metallic, or substantially inflexible side extension is provided on the flapper 230. This side extension is designed to provide a target for the vertical shaft 236 to strike and thus close the flapper 230. The vertical shaft 236 may also be driven downward by a solenoid 34 instead of or in addition to spring bias 36.

Figure 38:
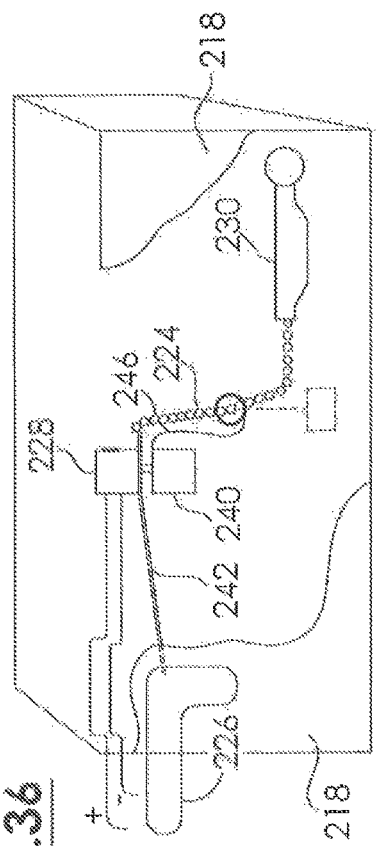
FIG. 38 is a diagrammatic representation of a forth variation of a forced closed flush valve passage actuator using a weigh in a non-actuated state and in dashed lines showing an actuated state.

In a fourth embodiment of the FCFVPA 222, a weight 240 is attached to the end of the flush lever arm 242, either on the flush chain 244 or on a line or wire 246 adjacent to the flush chain 244. The weight 240 is spring loaded 36 to release on the end of the flush lever arm 242 when actuated and does not restrict normal movement of the flush lever arm 242 or the flapper 230 when not actuated. The release actuator 228 can be on the arm 242 or even outside the tank 218. It is preferable if the weight 240 is a high density metal, and can be similar to a fishing weight. The weight 240 can measure as little as, for example, two to four ounces or up to, for example, six to eight ounces. If overflow is detected, the weight 240 is released or even propelled downward, pulling down the flapper 230. In one variation, when the weight 240 is released, the weight 240 slides down the line 246, pulling the end of the flapper 230 down and the momentum and water pressure seals the flapper 230. Alternatively, as shown in FIG. 38, the weight 240 could be fixedly attached to one end of the line 246 and the other end of the line 246 could be attached to a location on the chain 244 around or above the midpoint between the flush lever arm 242 and the flapper 230. When the weight 240 is released in this alternative variation, the weight 240 would pull down the line 246 that would then pull down the chain 244 that would then pull down the flapper 230. A reset would simply be to slide the weight 240 back to the latch 228.

While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items while only the terms "consisting of" and "consisting only of" are to be construed in the limitative sense.

I claim:

1. A flood prevention device comprising:
    a first solenoid valve;
    an input on the first solenoid valve designed to attach to and receive fluid flow from a first mainline water or gas source;
    a wiring harness to electrically connect the first solenoid valve to one of an appliance control unit and an appliance timer; and
    a first supply hose, with a first end attached to an output of the first solenoid valve and a second end designed to attach to and deliver fluid to an appliance;
    wherein the wiring harness has an effective length shorter than the first supply hose, such that the wiring harness is automatically disconnected before the first supply hose is fully extended if the appliance is moved away from the first solenoid valve.

2. The device of claim 1 wherein the wiring harness attaches to one of the appliance and the first solenoid valve with readily detachable attachments such that when the wiring harness is pulled the attachments become detached without damaging attachments or the harness.

3. The device of claim 1 wherein the first solenoid valve is a spring biased closed valve that automatically closes when current is not provided, and first supply hose is at a low pressure when the first solenoid valve is closed.

4. The device of claim 1 further comprising a second solenoid valve designed to attach to and receive water from a second mainline water or gas source.

5. The device of claim 4, wherein an output of both the first and the second solenoid valves flows to the first supply hose to be attached to the appliance.

6. The device of claim 4 wherein an output of the second solenoid valve flows to a second supply hose to be attached to the appliance.

7. The device of claim 1 wherein the first solenoid valve is powered and controlled by the one of the appliance control unit and appliance timer.

8. The device of claim 1 further comprising a plug in electrical connection on the appliance between the wiring harness and the one of the appliance control unit and appliance timer.

9. A flood prevention method comprising;
    attaching a first solenoid valve to a mainline water source exterior to an appliance,
    delivering the output of the first solenoid valve to the appliance via a first supply hose; and
    controlling and powering the first solenoid with one of an appliance control unit and a timer,
    wherein the appliance has a wiring harness with an effective length shorter than the first supply hose, such that the wiring harness is automatically disconnected before the first supply hose is fully extended if the appliance is moved away from the first solenoid valve.

10. The method of claim 9 further comprising the step of automatically closing the first solenoid valve when it is not receiving power.

11. The method of claim 9 further comprising the step of maintaining a low fluid pressure in the first supply hose when the first solenoid valve is closed.

12. The method of claim 9 further comprising the step of controlling and powering both an internal supply valve and the first solenoid valve via the one of the appliance control unit and appliance timer.

13. The method of claim 12 further comprising the step of synchronously opening and closing the first solenoid valve and the internal supply valve via the one of the appliance control unit and appliance timer.

14. The method of claim 9 wherein the wiring harness is external to the appliance and further comprising the step of transmitting electric current to the first solenoid valve from the one of the appliance control unit and appliance timer through the wiring harness.

15. The method of claim 14 further comprising the steps of
    providing a water sensor;
    connecting the water sensor in a circuit with the wiring harness;
    automatically interrupting current through the wiring harness when the water sensor detects water.

16. The method of claim 14 comprising the step of plugging the wiring harness into an electrical pug in connection on an outer surface of the appliance.

17. The method of claim 9 further comprising the step of wirelessly transmitting control signals to the first solenoid valve.

18. A flood prevention system comprising:
    a first solenoid valve;
    an input on the first solenoid valve designed to attach to and receive fluid flow from a first mainline water or gas source;
    a wiring harness electrically connected the first solenoid valve and to one of an appliance control unit and an appliance timer to provide power to and control the first solenoid valve; and
    a first supply hose, with a first end attached to an output of the first solenoid valve and a second end attached to an appliance to deliver fluid to the appliance;
    wherein the wiring harness has an effective length shorter than the first supply hose, such that the wiring harness is automatically disconnected before the first supply hose is fully extended if the appliance is moved away from the first solenoid valve.

* * * * *